United States Patent [19]

Sugie et al.

[11] Patent Number: 5,191,056

[45] Date of Patent: Mar. 2, 1993

[54] ARYLENE SULFIDE KETONE COPOLYMER AND PREPARATION PROCESS THEREOF

[75] Inventors: Kiyoshi Sugie; Hiroo Inata; Shunichi Matsumura, all of Yamaguchi, Japan

[73] Assignee: Teijin Limited, Osaka, Japan

[21] Appl. No.: 745,664

[22] Filed: Aug. 16, 1991

[30] Foreign Application Priority Data

Aug. 17, 1990 [JP] Japan ................................. 2-215717
Mar. 28, 1991 [JP] Japan ................................. 3-87257

[51] Int. Cl.$^5$ ........................ C08G 8/02; C08G 75/00
[52] U.S. Cl. .................................. 528/125; 528/126; 528/174; 528/219; 528/220; 528/373; 528/377; 528/378; 528/380
[58] Field of Search ............... 528/388, 125, 126, 174, 528/219, 220, 373, 377, 378, 380; 524/609, 496, 495, 609; 525/471

[56] References Cited

U.S. PATENT DOCUMENTS

| | | | |
|---|---|---|---|
| 4,690,972 | 9/1987 | Johnson et al. | 524/609 |
| 4,870,153 | 9/1989 | Matzner et al. | 528/125 |
| 4,963,651 | 10/1990 | Nesheiwat et al. | 528/483 |
| 5,037,954 | 8/1991 | Nesheiwat et al. | 528/499 |
| 5,045,629 | 9/1991 | Nesheiwat | 528/481 |

FOREIGN PATENT DOCUMENTS 3405523 8/1985 Fed. Rep. of Germany .

OTHER PUBLICATIONS

Journal of Polymer Science: Part A: Polymer Chemistry, vol. 27, 661–669 (1989).

*Primary Examiner*—John Kight, III
*Assistant Examiner*—Shelley Wright
*Attorney, Agent, or Firm*—Sughrue, Mion, Zinn, Macpeak & Seas

[57] ABSTRACT

The arylene sulfide ketone copolymers according to the present invention have mainly recurring units which are represented by formulas (I) and (II),

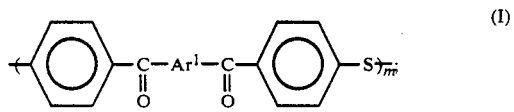

and

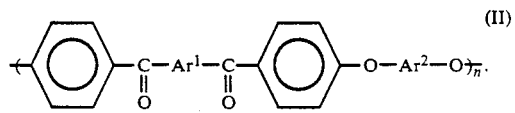

The arylene sulfide ketone copolymers have a high glass transition point and excellent moldability and can be produced with industrial advantage.

10 Claims, No Drawings

ARYLENE SULFIDE KETONE COPOLYMER AND PREPARATION PROCESS THEREOF

FIELD OF THE INVENTION

The present invention relates to arylene sulfide ketone copolymers obtained from bis(p-halobenzoyl)-naphthalene and the processes for preparation thereof. Particularly, the present invention relates to arylene sulfide-ketone copolymers which are excellent in chemical resistance, heat resistance and moldability.

BACKGROUND OF THE INVENTION

Polyarylene sulfide ketones are excellent in chemical resistance, acid resistance, alakli resistance, dimensional stability and mechanical properties, variety of uses have been investigated, for example, as engineering plastics, fibers, films, matrices for composite materials and/or the like.

For example, a poly(arylene sulfide ketone) obtained from 4,4'-difluorobenzophenone and sodium sulfide is disclosed in Journal of Polymer Science: part A, 27, 661–669 (1989).

Further, a poly(arylene sulfide ketone) obtained from 1,4-bis(4-fluorobenzoyl)benzene and sodium sulfide is described in DE-OS 3,405,523.

Those poly(arylene sulfide ketone)s, however, require improvements in heat resistance and moldability.

For example, U.S. Pat. No. 4,870,153 discloses a poly(arylene ether ketone) from 4,4'-bis(p-fluorobenzoyl)-naphthalene and hydroquinone.

Further, EP 0428743 describes poly(arylene ether ketone)s, and fibers and films made therefrom.

Those poly(arylene ether ketone)s have excellent characteristics as stated above, but a further improvement of heat resistance is required. Also, chlorides cannot be used as a starting substance because polymerizability is low and gelling frequently occurs during polymerization. Thus only fluorides have been employed, however, they are expensive.

SUMMARY OF THE INVENTION

An object of the invention is to provide novel arylene sulfide ketone copolymers.

Another object of the invention is to provide novel arylene sulfide ketone copolymers having superior moldability over conventional polyarylene sulfide ketone homopolymers.

Another object of the invention is to provide an industrially advantageous process for preparing the above-stated arylene sulfide ketone copolymers.

DETAILED DESCRIPTION OF THE INVENTION

Those and other objects and advantages of the present invention will be clarified in the following description.

According to the present invention, the above-stated objects and advantages of the invention are attained at first by arylene sulfide ketone copolymers comprising recurring units represented by the formulas (I) and (II):

$$\left[ \bigcirc - \underset{\underset{O}{\|}}{C} - Ar^1 - \underset{\underset{O}{\|}}{C} - \bigcirc - S \right]_m \quad (I)$$

and $$\left[ \bigcirc - \underset{\underset{O}{\|}}{C} - Ar^1 - \underset{\underset{O}{\|}}{C} - \bigcirc - O - Ar^2 - O \right]_n ; \quad (II)$$

wherein
Ar$^1$ is 1,5-, 2,6- or 2,7-naphthalene ring;
Ar$^2$ is selected from aromatic residues represented by the following formulas (1), (2) or (3);

$$\underset{(R_1)_i}{\bigcirc} - X - \underset{(R_2)_j}{\bigcirc} \quad (1)$$

$$\bigcirc\bigcirc \quad (2)$$

$$\bigcirc \quad (3)$$

wherein
x in formula (1) is a direct bond, —O—, —CO— or —CR$_3$R$_4$—;
R$_3$ and R$_4$ are identical or different and represent individually a hydrogen atom, methyl, ethyl or propyl group;
R$^3$ and R$^4$ may form a cyclohexane ring including the carbon atom to which they are bonded;
R$_1$ and R$_2$ are identical or different and each represents a methyl, ethyl or propyl group;
i and j are identical or different and each represents zero or an integer from 1 to 4; and
the bonding positions in the formula (2) are 1,5-, 2,6- or 2,7-, and
the m:n ratio is from 95:5 to 5:95 in molecuar ratio; and has an inherent viscosity of at least 0.3, when it is measured in concentrated sulfuric acid at 30° C.

In formulas (I) and (II), Ar$^1$ is a 1,5-, 2,6- or 2,7-naphthalene ring or a combination thereof and a 2,6-naphthalene ring is preferred.

In formula (II), Ar$^2$ is selected from aromatic residues represented by the formulas (1), (2) and (3), and the following residues are preferred:

$$-\bigcirc-\bigcirc-,$$

$$\underset{CH_3}{\overset{CH_3}{\bigcirc}} - \underset{CH_3}{\overset{CH_3}{\bigcirc}} -,$$

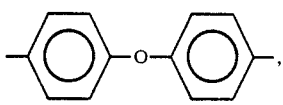

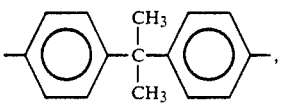

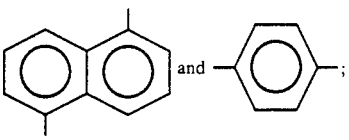

and further the following residues are particularly preferred:

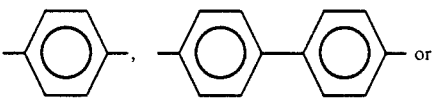

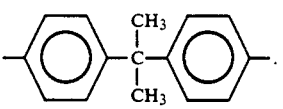

Therefore, in the preferable embodiments, $Ar^2$ is selected from by the formulas (1) or (3) and x in formula (1) is a direct bond or $-CR_3R_4-$. i and j are each zero or an integer of 2 and $R_1$, $R_2$, $R_3$ and $R_4$ are each methyl.

Thus, as the recurring units represented by the formula (I), the recurring units of the formula given below are preferred;

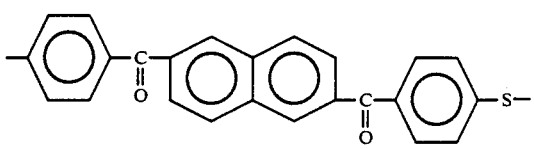

(corresponding to the case wherein $Ar^1$ is a 2,6-naphthalene ring in formula (I)), while the recurring units represented by formula (II) are preferably the following units

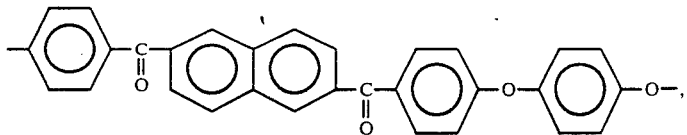

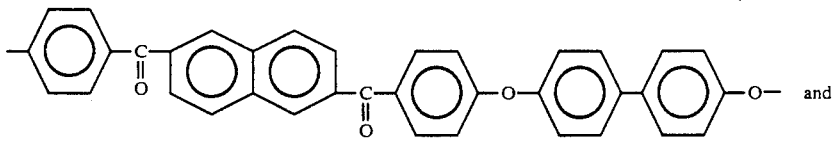

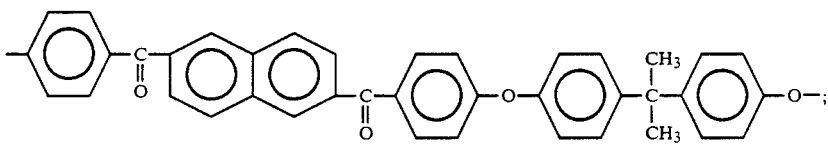

(corresponding to the case wherein $Ar^1$ is a 2,6-naphthalene ring; and $Ar^2$ is

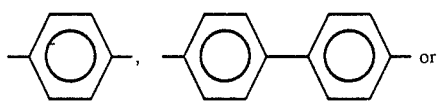

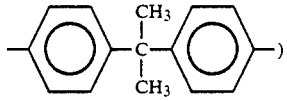

and wherein the m:n molecular ratio is from 95:5 to 5:95, preferably in the range from 95:5 to 60:40 and particularly preferably in the range from 90:10 to 70:30.

The arylene sulfide ketone copolymer according to the present invention has an inherent viscosity ($\eta_{inh}$) of at least 0.3, when it is measured in concentrated sulfuric acid at 30° C. The inherent viscosity is preferably at least 0.4. A viscosity less than 0.3 is not desirable because the mechanical properties of the polymer then are unsatisfactory. The upper limit of the inherent viscosity is preferably 2.0 and more preferably 1.5.

The optimal moldability is attained by the arylene sulfide ketone copolymers having such an inherent viscosity as indicated above.

One of the features of the arylene sulfide ketone copolymers according to the invention is its low melting point ($T_m$) compared to an arylene sulfide ketone homopolymer, corresponding to component (I). The melting point is preferably in the range from 320° C. to 420° C., particularly preferably in the range from 340° C. to 410° C. according to differential scanning calorimetry (DSC).

Another feature of the arylene sulfide ketone copolymer according to the invention is its high glass transition point ($T_g$) compared to an arylene ether ketone homopolymer, corresponding to component (II). The glass transition point is preferably at least 180° C., particularly preferably at least 185° C. according to DSC.

According to the present invention, the arylene sulfide ketone copolymers according the invention are prepared by polycondensation reactions comprising mixing a bis(p-halobenzoyl)-naphthalene of formula (III);

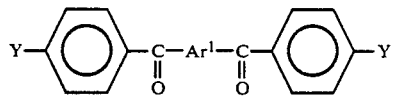

wherein
Ar$^1$ is identical to the definition in formulas (I) and (II);
Y is a halogen atom, with an aromatic dihydroxy compound of formula (IV);

HO—Ar$^2$—OH  (IV)

wherein
Ar$^2$ is identical to the definition in formula (II); and a sulfidization agent in an organic polar solvent in the presence of an alkaline substance.

In formula (III), the definition of Ar$^1$ is identical to that for formulas (I) and (II). In formula (III), Y is a halogen atom, for example, an iodine, bromine, chlorine or fluorine atom, and chlorine and fluorine are preferred.

As a bis(p-halobenzoyl)naphthalene represented by formula (III), are cited, for example, 1,5-bis(p-fluorobenzoyl)naphthalene, 2,6-bis(p-fluorobenzoyl)-naphthalene, 2,7-bis(p-fluorobenzoyl)naphthalene, 1,5-bis(p-chlorobenzoyl)naphthalene, 2,6-bis(p-chlorobenzoyl)-naphthalene, 2,7-bis(p-chlorobenzoyl)naphthalene, 1,5-bis(p-bromobenzoyl)naphthalene, 2,6-bis(p-bromobenzoyl)-naphthalene, 2,7-bis(p-bromobenzoyl)-naphthalene or the like and their combination, and 2,6-bis(p-fluorobenzoyl)naphthalene and 2,6-bis(p-chlorobenzoyl)naphthalene are preferred.

In the present invention, a part, for example, less than 30 mole % of the compound of formula (III) may be replaced with other halogen compounds, for example, 4,4'-difluorobenzophenone, 1,4-bis(p-fluorobenzoyl)-benzene, 4,4'-bis(p-fluorobenzoyl)diphenyl, 1,3'-bis(p-fluorobenzoyl)benzene, 4,4'-bis(p-fluorobenzoyl)diphenyl ether, 4,4'-dichlorodiphenyl sulfone, 4-fluoro-4'-hydroxybenzophenone, 4-chloro-4'-hydroxybenzophenone, 4-(p-fluorobenzoyl)-4'-hydroxydiphenyl ether, 2-(p-fluorobenzoyl)-6-hydroxynaphthalene, 4-chloro-4'-hydroxydiphenylslufone and the like.

In formula (IV), Ar$^2$ is defined the same as for formula (II). As an aromatic dihydroxy compound represented by formula (IV), there are cited, for example, 2,2-bis(4-hydroxy-phenyl)propane, 2,2-bis(4-hydroxyphenyl)butane, bis(4-hydroxyphenyl)methane, 1,1-bis(4-hydroxyphenyl)cyclohexane, di(4-hydroxyphenyl)ether, 4,4'-dihydroxydiphenyl, 3,3',5,5'-tetramethyl-4,4'-dihydroxydiphenyl, 4,4'-dihydroxybenzophenone, 1,5-dihydroxynaphthalene, 2,6-dihydroxynaphthalene, 2,7-dihydroxynaphthalene, hydroquinone, resorcinol or the like and their combination. Hydroquinone, dihydroxynaphthalene, 4,4'-dihydroxydiphenyl, 2,2-bis(4-hydroxyphenyl)propene, di(4-hydroxyphenyl)ether, 3,3',5,5'-tetramethyl-4,4'-dihydroxydiphenyl are preferred and hydroquinone, 4,4'-dihydroxydiphenyl and 2,2-bis(4-hydroxyphenyl)propane are particularly preferred.

The proportion of the compound of formula (IV) to that of formula (III) is 5 to 95 mole %, preferably 5 to 40 mole %, particularly 10 to 30 mole %.

As a sulfidization agent, an alkali metal sulfide such as sodium sulfide, lithium sulfide, potassium sulfide or rubidium sulfide can be used. Sodium sulfide and potassium sulfide are preferred. In addition, alkali sulfides produced by the reaction of hydrogen sulfide with an alkali hydroxide such as lithium hydroxide, sodium hydroxide, potassium hydroxide or the like also can be used.

The proportion of the sulfidization agent to the compound of formula (III) is preferably 90 to 110 mole %, and particularly 95 to 105 mole % in the combination with the compound of formula (IV).

As an alkaline substance, alkali metal hydroxides, carbonates, bicarbonates or fluorides are used. They can be used in the single form or in combination. As an alkali compound, are cited preferably potassium hydroxide, sodium hydroxide, potassium carbonate, sodium carbonate, potassium bicarbonate, sodium bicarbonate or the like. Potassium carbonate and sodium carbonate are particularly preferred.

The molar ratio of the alkaline compounds is preferably more than 90 equivalent % to the halogen in the compound of formula (III) in combination with the sulfidization agent, particularly 95 to 200 equivalent %.

When Y is fluorine in formula (III) and sodium sulfide or potassium sulfide is used as a sulfidization agent, the sodium fluoride or potassium fluoride formed by the reaction is alkaline and another alkaline compound is not always necessary.

As an organic polar solvent used in the reaction, there are cited, for example, an aprotic polar solvent, such as dimethylacetamide, diethylacetamide, N-ethylpyrrolidone, N-methylcaprolactam, N-methylpyrrolidone, N-cyclohexyl-2-pyrrolidone, dimethyl sulfoxide, sulfolane, dimethylimidazolidinone, tetramethyl urea, hexamethylphosphoric triamide or the like. N-methylcaprolactam and N-cyclohexyl-2-pyrrolidone are preferably used.

The reaction is conducted by heating at 200° to 360° C. preferably at 250° to 340° C. perticularly preferably at 250° to 320° C. and atmospheric pressure or pressurization.

After the polycondensation reaction proceeds to a desired level, when needed, a monofunctional chain-end terminator can be added to the polymer to block the terminal hydroxyl groups. As a monofunctional chain-end terminator, for example, p-chlorobenzophenone, p-fluorobenzophenone or methyl chloride are preferred. The chain-terminated polymers show excellent stability in forming, for example, melt-forming.

In the polycondensation reactions, an auxiliary agent can be used to increase the molecular weight of the copolymer When the sulfidization agent contains crystallization water or free water, the water can be removed before the polycondensation reaction.

The copolymer obtained can be isolated by reprecipitation in water, in which case the polymer is washed or rinsed with water or solvents, dried and collected in the form of powdery particles or granules.

The arylene sulfide ketone copolymers according to the invention are prepared at low cost with industrial advantage. Further, the copolymers according to the invention have low melting points in comparison with high glass transition points. Accordingly, the copolymers according to the invention are suitable for applications of the conventional melt processings such as injection molding, extrusion molding, compression molding or the like to give a variety of heat-resistant processed products such as films, sheets or moldings.

EXAMPLES

The present invention will be illustrated by the following examples, but the examples will be described only for illustration and not for limitation of the invention. Parts in the examples means parts by weight. The inherent viscosity ($\eta_{inh}$) was measured at a polymer concentration of 0.5 g/dl in concentrated sulfuric acid at 30° C. The glass transition point ($T_g$) and the melting point ($T_m$) of the polymers were measured by means of DSC at a temperature increase rate of 10° C./minute.

EXAMPLE 1

Sodium sulfide (2.11 parts) and N-cyclohexyl-2-pyrrolidone (54.1 parts) were introduced into a reactor provided with a mechanical stirrer and a distillation system. The reactor was replaced with nitrogen, and the mixture was dissolved with heat under a nitrogen flow at normal pressure. After cooling, hydroquinone (0.33 part) and 2,6-bis(p-fluorobenzoyl)naphthalene (11.17 parts) were added, the reactor was immersed in a bath at 250° C. and the temperature was raised to 300° C. in the course of 1 hour. The reaction was continued for another 2 hours at the same temperature.

The reaction mixture was cooled, diluted with methanol (79 parts), then extracted under reflux and filtered to collect the polymer in a powdery form. The powdery polymer was subjected to extraction with water under reflux 3-times to remove the solvent and inorganic salts, then dried under vacuum at 120° C. for 8 hours.

The resultant copolymer was found to have $\eta_{inh}$ of 0.459, $T_g$ of 187° C. and $T_m$ of 378° C.

EXAMPLE 2

The procedure of Example 1 was repeated except that potassium carbonate (0.37 part) was added together with hydroquinone to obtain another copolymer. It was found to have $\eta_{inh}$ of 0.636, $T_g$ of 185° C. and $T_m$ of 383° C. A pellet (15 mm diameter, 10 mm height) was obtained by means of compression molding at 390° C.

EXAMPLE 3

4,4'-Dihydroxydiphenyl (1.76 part), potassium carbonate (3.53 parts), sodium hydroxide (0.001 part) and N-methylcaprolactam (89 parts) were introduced into the reactor provided with a mechanical stirrer, a nitrogen gas inlet and a distillation system and heated to 250° C. under a nitrogen flow. Stirring was continued with heat for 2 hours, then the reaction mixture was allowed to stand for cooling, and then 2,6-bis(p-fluorobenzoyl)-naphthalene (11.17 parts) was added. Heating was started again and the polycondensation reaction was continued at 260° C. for 5 hours. After cooling, methanol was added to precipitate the copolymer, which was separated by filtration. The copolymer was purified by refluxing it with methanol and water to remove the remaining solvent and dried under vacuum at 100° C. for 5 hours. The resultant copolymer was found to have a $\eta_{inh}$ of 0.40, $T_g$ of 184° C. and $T_m$ of 358° C.

COMPARATIVE EXAMPLE 1

2,6-Bis(p-fluorobenzoyl)naphthalene (13.96 parts), sodium sulfide (3.00 parts), and N-cyclohexylpyrrolidone (54.1 parts) were introduced into the reactor equipped with a mechanical stirrer and a distillation system. The reactor was replaced with nitrogen gas and immersed in a bath maintained at 200° C. Under a nitrogen flow at atmospheric pressure, the temperature was raised to 290° C. over 30 minutes. The reaction was continued for 120 minutes. The reaction mixture was cooled, diluted with methanol (79 parts), then subjected to extraction treatment under reflux and filtered to give a powdery polymer. Further, refluxing with water was repeated 3 times to remove the solvent and inorganic salt. The powder was dried at 120° C. under vacuum for 8 hours. The polymer was found to have a $\eta_{inh}$ of 0.54, $T_g$ of 187° C. and $T_m$ of 400° C.

EXAMPLE 4

2,6-Bis(p-fluorobenzoyl)naphthalene (37.24 parts), N-cyclohexylpyrrolidone (155 parts) and mesitylene (30 parts) were introduced into a reactor equipped with a mechanical stirrer, a nitrogen inlet and a distillation system, and heated to 230° C. under a nitrogen flow. Further, potassium carbonate (1.38 part) and potassium hydrogen carbonate (0.40 part) were added to the mixture, then a solution comprising sodium sulfide nonahydrate (21.62 parts), bisphenol A (2,2-bis(p-hydroxyphenyl)propane (2.28 parts) and N-cyclohexylpyrrolidone (41 parts) was added. The water formed by the reactions was azeotropically distilled and the mixture was heated at 280° C. to effect the reaction for 3 hours.

The reaction mixture was poured into 10% aqueous phosphoric acid to precipitate the polymer. Further, the polymer was crushed with a mixer and washed with water and refluxed together with methanol to remove the remaining solvent, then dried at 100° C. for 5 hours.

The resultant polymer was found to have a $\eta_{inh}$ of 0.65, $T_g$ of 192° C. and $T_m$ of 378° C.

EXAMPLES 5 AND 6

2,6-Bis(p-fluorobenzoyl)naphthalene, 4,4'-dihydroxydiphenyl, sodium sulfide, potassium carbonate or sodium hydroxide in amounts given in Table 1, repsectively, and N-cyclohexylpyrrolidone (52 parts) were charged into a reactor equipped with a mechanical stirrer, a nitrogen inlet and a distillation system, and the mixture was heated to 250° C. under a nitrogen flow. After stirring under heating for 2 hours, the mixture was left to cool, then 2,6-bis(pfluorobenzoyl)naphthalene (11.17 parts) and N-cyclohexylpyrrolidone were added to the mixture. The mixture was heated again and the polycondensation reaction was carried out at 305° C. for 5 hours. After cooling, methanol (160 parts) was added to precipitate the polymer, which was filtered. The polymer was purified by refluxing with methanol and water to remove the remaining solvent and other impurities and dried at 100° C. under vacuum for 5 hours. The resultant copolymers were found to have the $\eta_{inh}$, $T_g$ and $T_m$ values shown in Table 2.

TABLE 1

| | Charge Stock Composition (parts by weight) | | | | |
|---|---|---|---|---|---|
| Example | 2,6-bis(p-fluorobenzoyl)naphthalene | 4,4'-dihydroxydiphenyl | sodium sulfide | potassium carbonate | sodium hydroxide |
| 5 | 11.17 | 0.61 | 2.32 | 0.41 | 0.014 |

TABLE 1-continued

| Example | 2,6-bis(p-fluorobenzoyl)naphthalene | 4,4'-dihydroxydiphenyl | sodium sulfide | potassium carbonate | sodium hydroxide |
| --- | --- | --- | --- | --- | --- |
| 6 | 11.17 | 0.59 | 2.24 | 0.39 | 0.014 |

Charge Stock Composition (parts by weight)

TABLE 2

| Example | η inh | $T_g$ | $T_m$ |
| --- | --- | --- | --- |
| 5 | 0.90 | 215° C. | 403° C. |
| 6 | 0.81 | 218° C. | 408° C. |

EXAMPLE 7

Example 4 was repeated except that the charges were changed according to Table 3. The characteristics of the copolymer are given in Table 4.

TABLE 3

Charge Stock Composition (parts by weight)

| Example | 2,6-bis(p-fluorobenzoyl)naphthalene | aromatic dihydroxy compound | sodium sulfide | potassium carbonate | sodium hydroxide |
| --- | --- | --- | --- | --- | --- |
| 7 | 11.17 | 4,4'-dihydroxydiphenyl/hydroquinone 0.59/0.35 | 1.97 | 0.78 | 0.012 |

TABLE 4

| Example | η inh | $T_g$ | $T_m$ |
| --- | --- | --- | --- |
| 7 | 0.70 | 205° C. | 386° C. |

COMPARATIVE EXAMPLE 2

2,6-Bis(p-fluorobenzoyl)naphthalene (37.24 parts), hydroquinone (9.91 parts), 4,4'-dihydroxydiphenyl (1.86 part) and diphenyl sulfone (70 parts) were introduced into a reactor equipped with a mechanical stirrer and a distillation system, then the reactor was replaced with nitrogen gas and heated to 200° C. After about 15 minutes, the mixture melted to form a homogeneous solution. Subsequently, potassium carbonate (12.5 parts) was added and the mixture was heated under a nitrogen flow at normal pressure at 200° C. for 1 hour, then at 250° C. for 1 hour and further at 340° C. for 120 minutes. The reaction mixture was cooled and crushed into chips of less than 500 μm particle sizes. The chips were subjected to an extraction treatment by refluxing with acetone twice, with water twice and with acetone again once to remove diphenyl sulfone and inorganic salt, and dried at 150° C. for 3 hours. The polymer obtained was found to have a $\eta_{inh}$ of 0.68, $T_g$ of 175° C. and $T_m$ of 366° C.

EXAMPLE 8

3,3'5,5'-Tetramethyl-4,4'-dihydroxydiphenyl (0.76 part), potassium carbonate (0.39 part), sodium sulfide (2.21 parts), sodium hydroxide (0.014 part) and N-methylcaprolactam (51 parts) were charged in a reactor provided with a mechanical stirrer, a nitrogen gas inlet and a distillation system and heated to 250° C. under a nitrogen flow. Stirring was continued with heat for 2 hours, then the mixture was allowed to stand for cooling, and 2,6-bis(p-fluorobenzoyl)naphthalene (11.17 parts) and N-methylcaprolactam (51 parts) were added to the mixture. The mixture was heated again at 260° C. for 5 hours to effect the polycondensation reaction. After cooling, methanol (160 parts) was added to precipitate the copolymer, which was separated by filtration. The copolymer was refluxed with methanol and water to remove the remaining solvent and the purified copolymer was dried at 100° C. under vacuum for 5 hours. The copolymer was found to have a $\eta_{inh}$ of 0.32, $T_g$ of 211° C. and $T_m$ of 396° C.

EXAMPLE 9

Example 1 was repeated except that 2,6-bis(p-chlorobenzoyl)naphthalene (12.16 parts) was used instead of 2,6-bis(p-fluoro-benzoyl)naphthalene (11.17 parts) to give a copolymer. The copolymer was found to have a $\eta_{inh}$ of 0.40, $T_g$ of 185° C. and $T_m$ of 377° C.

COMPARATIVE EXAMPLE 3

Hydroquinone (5.62 parts) and anhydrous potassium carbonate (7.05 parts) were introduced into a reactor equipped with a mechanical stirrer, a nitrogen inlet and a distillation system and nitrogen replacement was repeated 3-times. 1-Cyclohexyl-2-pyrrolidone (50 parts) was added and the mixture was heated with stirring under a nitrogen stream until dissolved. After cooling, 2,6-bis(p-chlorobenzoyl)naphthalene (20.26 parts) was added and the mixture was heated again to 250° C. for 1 hour. Further, the temperature was raised to 300° C. and held there for 5.5 hours. After cooling, the polymer was refluxed with water to leach out the solvent and the remaining polymer was dried. The polymer was a powder of pale brown and found to have a $\eta_{inh}$ of 0.19 and a low polymerization degree.

What is claimed is:

1. An arylene sulfide ketone copolymer comprising recurring units represented by the formulas (I) and (II):

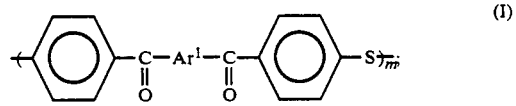

(I)

and

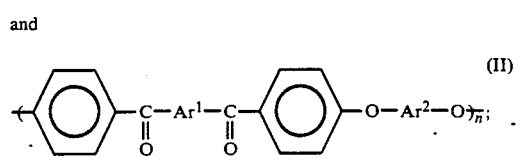

(II)

wherein
$Ar^1$ is a 1,5-, 2,6- or 2,7-naphthalene ring;
$Ar^2$ is selected from aromatic residues represented by the following formulas (1), (2) or (3),

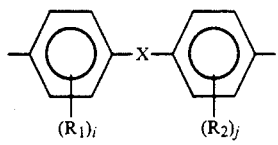 (1)

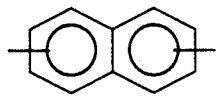 (2)

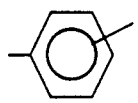 (3)

wherein x in formula (1) is a direct bond, —O—, —CO— or —CR$_3$R$_4$—;

R$_3$ and R$_4$ are identical or different and represent individually a hydrogen atom, methyl, ethyl or propyl group;

R$_3$ and R$_4$ may form a cyclohexane ring including the carbon atom to which they are bonded;

R$_1$ and R$_2$ are identical or different and each represents methyl, ethyl or propyl group;

i and j are identical or different and each represents zero or an integer of from 1 to 4; and the bonding positions in the formula (2) are 1,5-, 2,6- or 2,7-;

the m:n ratio is from 95:5 to 5:95 in molecular ratio; and has an inherent viscosity of at least 0.3 when measured in concentrated sulfuric acid at 30° C.

2. A process for preparing the arylene sulfide ketone copolymer of claim 1 by polycondensation reactions comprising mixing a bis(p-halobenzoyl)naphthalene of formula (III):

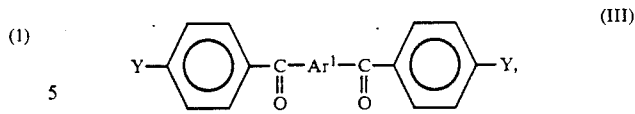 (III)

wherein

Ar$^1$ is identical to the definition in formulas (I) and (II), and

Y is a halogen atom, with an aromatic dihydroxy compound of formula (IV):

HO—Ar$^2$—OH    (IV);

wherein

Ar$^2$ is identical to the definition in formula (II), and a sulfidization agent in an organic polar solvent in the presence of an alkaline substance.

3. The arylene sulfide ketone copolymer of claim 1 wherein Ar$^1$ is a 2,6-naphthalene ring.

4. The arylene sulfide ketone copolymer of claim 1 wherein Ar$^2$ is selected from by the formulas (1) or (3).

5. The arylene sulfide ketone copolymer of claim 1 wherein X in formula (1) is direct or —CR$_3$R$_4$—.

6. The arylene sulfide ketone copolymer of claim 1 wherein i and j are each zero or an integer of 2.

7. The arylene sulfide ketone copolymer of claim 1 wherein R$_1$ and R$_2$ are each methyl.

8. The arylene sulfide ketone copolymer of claim 1 wherein R$_3$ and R$_4$ are each methyl.

9. The arylene sulfide ketone copolymer of claim 1 wherein Ar$^2$ is

 or

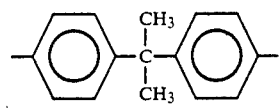

10. The arylene sulfide ketone copolymer of claim 1 wherein the m:n ratio is from 90:10 to 70:30.

* * * * *